United States Patent [19]
von Gentzkow

[11] Patent Number: 5,942,584
[45] Date of Patent: Aug. 24, 1999

[54] FLAME-RETARDANT POLYAMIDES

[75] Inventor: Wolfgang von Gentzkow, Bundesrepublik, Germany

[73] Assignee: Siemens Aktiengesellschaft, München, Germany

[21] Appl. No.: 08/930,521

[22] PCT Filed: Mar. 15, 1996

[86] PCT No.: PCT/DE96/00465

§ 371 Date: Sep. 29, 1997

§ 102(e) Date: Sep. 29, 1997

[87] PCT Pub. No.: WO96/30441

PCT Pub. Date: Oct. 3, 1996

[30] Foreign Application Priority Data

Mar. 31, 1995 [DE] Germany .......................... 195 12 175

[51] Int. Cl.$^6$ .......................... C08L 77/00; C08G 69/48; C08K 5/34
[52] U.S. Cl. .......................... 525/419; 525/420; 524/100; 524/122; 524/123; 524/494; 524/600; 524/606
[58] Field of Search ..................... 524/600, 606, 524/100, 494, 122, 123; 525/419, 420

[56] References Cited

U.S. PATENT DOCUMENTS

| | | | |
|---|---|---|---|
| 2,856,369 | 10/1958 | Smith et al. | 260/2 |
| 4,788,259 | 11/1988 | Nielinger et al. | 525/420 |
| 4,789,698 | 12/1988 | Buntenet et al. | 524/100 |
| 5,047,459 | 9/1991 | Walde et al. | 524/100 |
| 5,476,887 | 12/1995 | Court et al. | 524/100 |
| 5,618,864 | 4/1997 | Court et al. | 524/100 |

FOREIGN PATENT DOCUMENTS

| | | |
|---|---|---|
| 0 589 284 | 3/1994 | European Pat. Off. . |
| 39 09 145 | 9/1990 | Germany . |
| 1 280 118 | 7/1972 | United Kingdom . |

OTHER PUBLICATIONS

El Sayed, A. et al., "Polyamide (PA)," Kunststoffe 80 (1990), pp. 1107–1112.

Mateva, R. et al., "Flammability and Thermal Behavior of Phosphorus–Containing Polyamide–6," Journal of Applied Polymer Science, vol. 47 (1993), pp. 1185–1192.

Adam, W. et al., "Epoxidation of Enol Silyl Ethers, Phosphates, Esters, and Lactones by Dimethyldioxirane," Chem. Ber 124 (1991), pp. 2361–2368.

Chemical Abstract, vol. 56 (1962), p. 3511.

Springs, B. et al., "A One–Step Synthesis of Epoxyphosphonates," J. Org. Chem., vol. 41 (1976), pp. 1165–1168.

Gravalos, K., "Synthesis and Flammability of Copolyisophthalamides," Journal of Polymer Science: Part A: Polymer Chemistry, vol. 30 (1992), pp. 2521–2529.

Agawa, T. et al. "Synthesis of Dialkyl Epoxyethylphosphonates," Synthesis, 1971, pp. 27–28.

Yamashita, M. et al., "Novel Preparation of Diphenylvinylphosphine Oxides via Direct Deoxygenation of 1,2–Epoxyethyldiphenylphosphine Oxides with Diphosphorus Tetraiodide," Synthesis, 1985, pp. 65–55.

*Primary Examiner*—P. Hampton-Hightower
*Attorney, Agent, or Firm*—Kenyon & Kenyon

[57] ABSTRACT

A polyamide, a copolyamide, or a polyamide blend is reacted with a monoepoxy-functional phosphorus compound at an elevated temperature to produce flame-retardant polyamides, where the amount of phosphorus compound is 5 wt % to 35 wt %, based on the total composition, i.e., the polyamide mixture.

15 Claims, No Drawings

FLAME-RETARDANT POLYAMIDES

BACKGROUND OF THE INVENTION

The invention concerns a process for producing flame-retardant polyamides.

Synthetic polyamides (PA) are used in a variety of applications in many areas of the industry and for everyday consumption. This is due mainly to the good processing properties and the possibility of tailoring these polymers to the application. At present, just under 90% of polyamide consumption consists of the standard types polyamide 6 (poly-ε-caprolactam) and polyamide 66 (polyhexamethyleneadipamide); polyamide 11 (polyundecaneamide), polyamide 12 (poly-ε-laurinlactam), polyamide 610 (polyhexamethylenesebacamide) and polyamide 612 (polyhexamethylenedodecaneamide) and copolyamides account for the remaining 10%. More than 80% of worldwide polyamide production is processed to fibers and fabrics; just under 20% is used in industrial applications, in particular in automotive engineering, the electronics industry, the packaging sector and construction of machinery and equipment. The good mechanical properties often required industrially are achieved with fiber reinforcement or mineral fillers. In the field of electrical engineering, the use of polyamides has been successful because of their high insulation resistance, good tracking resistance and solvent resistance as well as good thermo-mechanical properties, in particular for insulation and switch parts, solenoid valves, busbars, cable mounts, coil bodies, plug connectors, and casings.

Although polyamides are self-extinguishing according to some test methods, they lose this property after the addition of fillers such as glass fibers or pigments. For numerous applications in electrical engineering and in automotive engineering, however, reinforced, flameproof polyamide is needed. The flameproofing should offer enough time to rescue people and valuables in the event of a fire.

At the present time, mainly organic halogen compounds and red phosphorus are used as flameproofing agents. The halogen compounds are mainly chlorinated or brominated hydrocarbons, which are often combined with zinc compounds or antimony trioxide, the latter of which has a synergistic effect but has been found to be carcinogenic in animal experiments. Halogen compounds have the disadvantage that they release highly corrosive and highly toxic degradation products such as hydrogen chloride and hydrogen bromide in a fire and they cause heavy production of smoke; they also reduce the toughness and tracking resistance of polyamides. Red phosphorus is usually used in encapsulated form. Despite the encapsulation, however, there is the danger of phosphorus fires at high processing temperatures. This can lead to increased wear on the processing machines and even explosions as a result of disproportionation to phosphine and phosphates. Another disadvantage is the poor electrical corrosion property of polyamide materials finished with red phosphorus to be flame-retardant, besides their dark color.

To avoid the disadvantages associated with halogen compounds and red phosphorus, there have been attempts for several years to develop flameproofed polyamides without such flameproofing agents. For example, the use of nitrogen compounds such as dicyanodiamide (German Offenlegungsschrift No. 3,909,145), melamine and melamine salts (German Offenlegungsschrifts Nos. 3,609,341 and 4,141,861) and melamine adducts (German Offenlegungsschrift No. 3,722,118) has been proposed. To achieve adequate flame retardancy, in particular with glass fiber-reinforced materials, however, very high filler levels are required, which have a negative effect on the mechanical properties. Magnesium hydroxide, which has also been proposed (*Kunststoffe*, vol. 80 (1990) pages 1107–1112), also causes a weakening of the mechanical strength, when used in the required high concentrations; the release of water, which begins at the processing temperature, also causes bubbles to form. For partially aromatic polyamides, the use of high concentrations of polyphosphonates has also been proposed (German Offenlegungsschrift No. 36 13 490). However, the flame retardancy achieved in that way is inadequate at high levels of glass fiber filling; moreover, the mechanical properties of the polyamides are severely impaired.

Furthermore, it has already been proposed that polyamide synthesis be performed in the presence of compounds that are incorporated into the polymer chain during polymerization. Thus, for example, the use of N-phosphonates and N-phosphates of ε-caprolactam has been recommended for polymerization of ε-caprolactam (see *Journal of Applied Polymer Science*, vol. 47 (1993) pages 1185–1192). In addition, the synthesis of phosphorus-containing copolymers, e.g., by reacting 3,3'-diaminodiphenyl phosphine oxide with 1,3-phenyleneisophthalamide, and the use of these copolymers as flameproofing agents have been recommended (see *Journal of Polymer Science, Part A, Polymer Chemistry*, vol. 30 (1992) pages 2521–2529). Apart from the great expense required in these cases, the resulting flame retardancy is inadequate for industrial applications.

SUMMARY OF THE INVENTION

The object of this invention is to provide a process that can be carried out easily and inexpensively and makes it possible to synthesize polyamides which have adequate flame retardancy for industrial applications, do not contain any halogen compounds or red phosphorus, but nevertheless can be processed without problems, permit light pigmentations, meet all requirements regarding electrical, chemical, mechanical and thermal properties and in particular are also suitable for use in electrical engineering and electronics, where large quantities of fillers are required.

DETAILED DESCRIPTION OF THE INVENTION

This is achieved according to this invention due to the fact that a polyamide, a copolyamide or a polyamide blend is reacted at an elevated temperature with a monoepoxy-functional phosphorus compound having the structure:

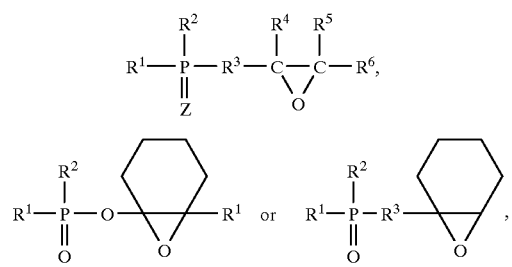

where

Z=O or S,

R$^1$ and R$^2$=alkyl, O-alkyl, or S-alkyl, each with 1–4 carbons, phenyl, O-phenyl, S-phenyl, naphthyl, O-naphthyl, benzyl, or O-benzyl, $R^3$=a single bond, O, alkylene, O-alkylene (O bound to P), or S-alkylene (S bound to P), each with 1–4 carbons, phenylene, or O-phenylene (O bound to P), $R^4$, $R^5$ and $R^6$=H, alkyl, or hydroxyalkyl, each with 1–4 carbons, phenyl or benzyl, and $R^5$ and/or $R^6$ may also denote —$R^3$—P(O)$R^1R^2$, where the phosphorus compound amounts to 5–35 wt %, based on the total composition, i.e., the mixture of polyamide and phosphorus compound and the optional additive (polyamide mixture).

It has surprisingly been found that with a procedure according to the invention, the phosphorus compound is chemically anchored to the polymer chain. Therefore, a simple process yields phosphorus-modified polyamides that have adequate flame retardancy, without the use of halogen or red phosphorus, and meet all the industrial requirements. It has also been found that the flame retardancy achieved depends only on the amount of phosphorus anchored to the polymer chain.

The process according to the invention, which takes place at an elevated temperature, i.e., generally at a temperature of >150° C. (upper limit: ≦350° C.) can be carried out in known heatable mixing equipment such as kneaders, mixing rolls, and extruders. It is possible to prepare premixes of the polyamide and the phosphorus compound, e.g., in a drum mixer or a fluid mixer, or to add the phosphorus compound directly to the polyamide melt, distribute it therein and react it with the polyamide, i.e., anchor it to the polymer chain. To prevent evaporation losses when adding the phosphorus compound, it has proven advantageous to use phosphorus compounds with a molar weight of ≧150. At the same time, other additives such as fillers, in particular glass fibers, and colorants, antioxidants, processing aids, etc., may be incorporated and distributed in the polyamide; filler mixtures may also be used. However, the additives may also be incorporated in advance or in a subsequent mixing operation.

In the process according to this invention, other halogen-free flameproofing agents may also be added to the polyamide mixture to advantage. Melamine cyanurate, melamine phosphate, and magnesium hydroxide are preferably used as such flameproofing agents.

The phosphorus compounds used according to this invention are known per se. Reference is made to the following documents as examples:

(1) U.S. Pat. No. 2,856,369;

(2) German Offenlegungsschrift No. 19 43 712;

(3) Chemical Abstracts, vol. 56 (1962) 3511;

(4) Synthesis, 1971, pages 27 and 28;

(5) Journal of Organic Chemistry, vol. 41 (1976) pages 1165–1168;

(6) Synthesis, 1985, pages 65 and 66;

(7) Chemische Berichte, vol.124 (1991), pages 2361–2368.

The amount of phosphorus compound needed to make the polyamides flame-retardant will depend on the chemical structure of the polyamides and the additives. For example, polyamide 6 and polyamide 66 require less phosphorus than polyamide 11 and polyamide 12. On the other hand, polyamide mixtures containing large amounts of fillers such as glass fibers require higher phosphorus concentrations than mixtures without fillers. The required phosphorus content is therefore between 1 wt % and 5 wt %, based on the polyamide mixture. Since flame retardancy of the polyamides depends only on the phosphorus concentration in the polymer matrix, different amounts of phosphorus compound are needed. The required amount is 5 wt % to 35 wt %, based on the polyamide mixture, as needed, depending on the phosphorus content of the phosphorus compound.

The process according to this invention has the following advantages in particular:

the polymer can be modified very easily and inexpensively in a mixing or extrusion process, such as that required anyway for homogenizing the polyamides after synthesis or compounding them for various industrial purposes;

the processing characteristics and the overall properties of the polyamides are not affected significantly by the phosphorus modification;

light pigmentations of the polyamides are possible with no problem;

the polyamides do not contain any volatile components, so there is no damage or passivation of electric contacts when used in electrical engineering and electronics;

no corrosive components are released from the polyamides;

the polyamides can be recycled.

The flame-retardant polyamides produced by the process according to this invention are advantageously suitable as insulation materials, construction materials and casing materials in electronics and electrical engineering. Additional fields of use include automotive engineering, the packaging industry, machine and apparatus construction.

The invention is explained in detail below on the basis of the following examples.

The following components are used to produce polyamide molding compounds:

Component A: polyamide 6 with a relative viscosity $\eta_{rel}$ of 2.9 (measured on a 0.5% solution in 96% $H_2SO_4$ according to ISO 307)

Component B: polyamide 66 with a relative viscosity $\eta_{rel}$ of 2.7

Component C: melamine cyanurate

Component D: glass fibers with an average diameter of 10 μm

Phosphorus compounds I through VI that were used are summarized in Table 1; synthesis of these compounds is described in publications (1), (4), (5), and (6).

Preparation of mixtures 1 through 10 and the corresponding molding compounds: Table 2 summarizes the amounts of components A through D and phosphorus compounds I through VI used to prepare the mixture. To prepare the mixtures, the corresponding parts by weight (p.b.w.) of component A or B are plastified at 260–290° C. in a Brabender two-roll kneading machine; then the corresponding amounts of phosphorus compounds I through VI are added in such a way that there is no lubricating effect. After adding the respective phosphorus compound, the mixture is kneaded for at least 5 minutes to distribute the phosphorus compound well and anchor it chemically to the polymer matrix. Optionally after adding the phosphorus compound, components C and D are added, either simultaneously or in succession, and then the mixture is kneaded for at least 5 minutes. After the end of the kneading process, the mixture is removed from the kneader and cooled. The cooled melt is then ground and injection molded to produce molded articles. Using these molded articles, the flame retardancy is measured according to UL 94 V (1.6 mm thick test rods), the modulus of elasticity is measured according to DIN 53,457 and the impact strength is measured according to DIN 53,453. The values thus obtained are summarized in Table 2.

Preparation of mixtures 11 and 12 and the corresponding molding compounds:

The parts by weight of polyamide 6 (component A) listed in Table 2 are premixed with the stated parts by weight of phosphorus compound V or VI at 100° C. to 150° C. in a drum mixer or a stirred vessel and then mixed at a stock temperature of 300° C. in a twin-screw extruder (ZSK 32, Werner & Pfleiderer), then extruded into a water bath, chopped, dried and injection molded to produce molded articles. The results are summarized in Table 2.

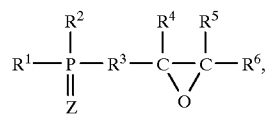

TABLE 1

Phosphorus compounds having the general structure

| No. | $R^1$ | $R^2$ | $R^3$ | $R^4$ | $R^5$ | $R^6$ | Z |
|---|---|---|---|---|---|---|---|
| I | $C_2H_5O$ | $C_2H_5O$ | — | H | H | H | O |
| II | $CH_3O$ | $CH_3O$ | — | $CH_3$ | H | H | O |
| III | $C_6H_5$ | $C_6H_5$ | — | $CH_3$ | H | H | O |
| IV | $CH_3$ | $CH_3$ | $-OCH_2-$ | H | H | H | O |
| V | $CH_3$ | $CH_3$ | $-OCH_2-$ | H | H | $-CH_2O-P(CH_3)_2=O$ | O |
| VI | $C_6H_5$ | $C_6H_5$ | $-SCH_2-$ | H | H | H | S |

TABLE 2

Composition of the mixtures and test results on the molding compounds

| Example | 1 | 2 | 3 | 4 | 5 | 6 | 7 | 8 | 9 | 10 | 11 | 12 |
|---|---|---|---|---|---|---|---|---|---|---|---|---|
| Component A (p.b.w.) | 85 | 87 | 80 | 85 | 55 | — | — | 60 | 55 | — | 90 | 70 |
| Cncnponent B (p.b.w.) | — | — | — | — | — | 55 | 50 | — | — | 55 | — | — |
| Component C (p.b.w.) | — | — | — | — | — | — | 10 | — | 10 | 10 | — | — |
| Component D (p.b.w.) | — | — | — | — | 30 | 30 | 30 | 30 | 30 | 30 | — | — |
| Phosphorus compound I (p.b.w.) | 15 | — | — | — | — | — | — | — | — | — | — | — |
| Phosphorus compound II (p.b.w.) | — | 13 | — | — | — | — | — | — | — | — | — | — |
| Phosphorus compound III (p.b.w.) | — | — | 20 | — | — | — | — | — | — | — | — | — |
| Phosphorus compound IV (p.b.w.) | — | — | — | 15 | 15 | 15 | 10 | — | — | — | — | — |
| Phosphorus compound V (p.b.w.) | — | — | — | — | — | — | — | 10 | 5 | 5 | 10 | — |
| Phosphorus compound VI (p.b.w.) | — | — | — | — | — | — | — | — | — | — | — | 30 |
| Phosphorus content (%) | 2.58 | 2.43 | 2.4 | 3.1 | 3.1 | 3.1 | 2.07 | 2.42 | 1.21 | 1.21 | 2.42 | 3.0 |
| Test results: | | | | | | | | | | | | |
| UL 94 V/1.6 mm | V-0 | V-0 | V-0 | V-0 | V-0 | V-0 | V-1 | V-1 | V-1 | V-0 | V-0 | V-0 |
| Impact strength (kJ/m²) | 41 | 42 | 40 | 43 | 45 | 47 | 40 | 48 | 42 | 40 | 40 | 42 |
| Breaking elongation (%) | 10 | 9 | 10 | 8.5 | 3.5 | 4 | 3.5 | 3.5 | 3 | 2.3 | 10 | 10 |
| Tensile strength (Mpa) | 150 | 150 | 140 | 150 | 120 | 120 | 1tO | 120 | 110 | 120 | 150 | 150 |
| Modulus of elasticity (N/mm²) | 8600 | 8800 | 8500 | 8800 | 10,000 | 11,000 | 8,000 | 9700 | 8200 | 8500 | 8800 | 8200 |

What is claimed is:

1. A process for producing a flame-retardant polyamide, comprising the steps of reacting a polyamide, a copolyamide or a polyamide blend at a temperature $\geq 150°$ C. with a monoepoxy-functional phosphorus compound having the structure:

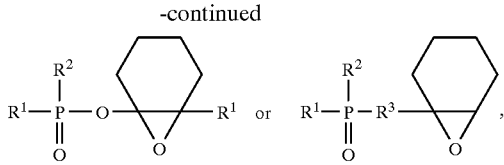

-continued where z=O or S,

R$^1$ and R$^2$=alkyl, O-alkyl, or S-alkyl, each with 1–4 carbons, phenyl, O-phenyl, S-phenyl, naphthyl, O-naphthyl, benzyl, or O-benzyl, R$^3$=a single bond, O, alkylene, O-alkylene (O bound to P), or S-alkylene (S bound to P), each with 1–4 carbons, phenylene or O-phenylene, (O bound to P), R$^4$, R$^5$ and R$^6$=H, alkyl or hydroxyalkyl, each with 1–4 carbons, phenyl or benzyl, and R$^5$ and/or R$^6$ may also denote —R$^3$—P(O)R$^1$R$^2$, wherein the phosphorus compound amounts to 5–35 wt %, based on the total composition.

2. The process according to claim 1, wherein the additive is incorporated into the polyamide.

3. The process according to claim 2, wherein an additive is a filler.

4. The process according to claim 3, wherein glass fibers are used as the filler.

5. The process according to claim 1, wherein a halogen-free flameproofing agent is added to the polyamide.

6. The process according to claim 2, wherein a halogen-free flameproofing agent is added to the polyamide.

7. The process according to claim 3, wherein a halogen-free flameproofing agent is added to the polyamide.

8. The process according to claim 4, wherein a halogen-free flameproofing agent is added to the polyamide.

9. The process according to claim 5, wherein melamine cyanurate, melamine phosphate, or magnesium hydroxide is used as the flameproofing agent.

10. The process according to claim 6, wherein melamine cyanurate, melamine phosphate, or magnesium hydroxide is used as the flameproofing agent.

11. The process according to claim 7, wherein melamine cyanurate, melamine phosphate, or magnesium hydroxide is used as the flameproofing agent.

12. The process according to claim 8, wherein melamine cyanurate, melamine phosphate, or magnesium hydroxide is used as the flameproofing agent.

13. A insulation material comprising the flame-retardant polyamide, according to claim 1.

14. A construction material comprising the flame-retardant polyamide, according to claim 1.

15. A casing material comprising the flame-retardant polyamide, according to claim 1.

* * * * *